April 5, 1960 A. W. RAUTH 2,931,216
SYSTEM OF TESTING GAS METERS
Filed Oct. 24, 1955 4 Sheets-Sheet 1
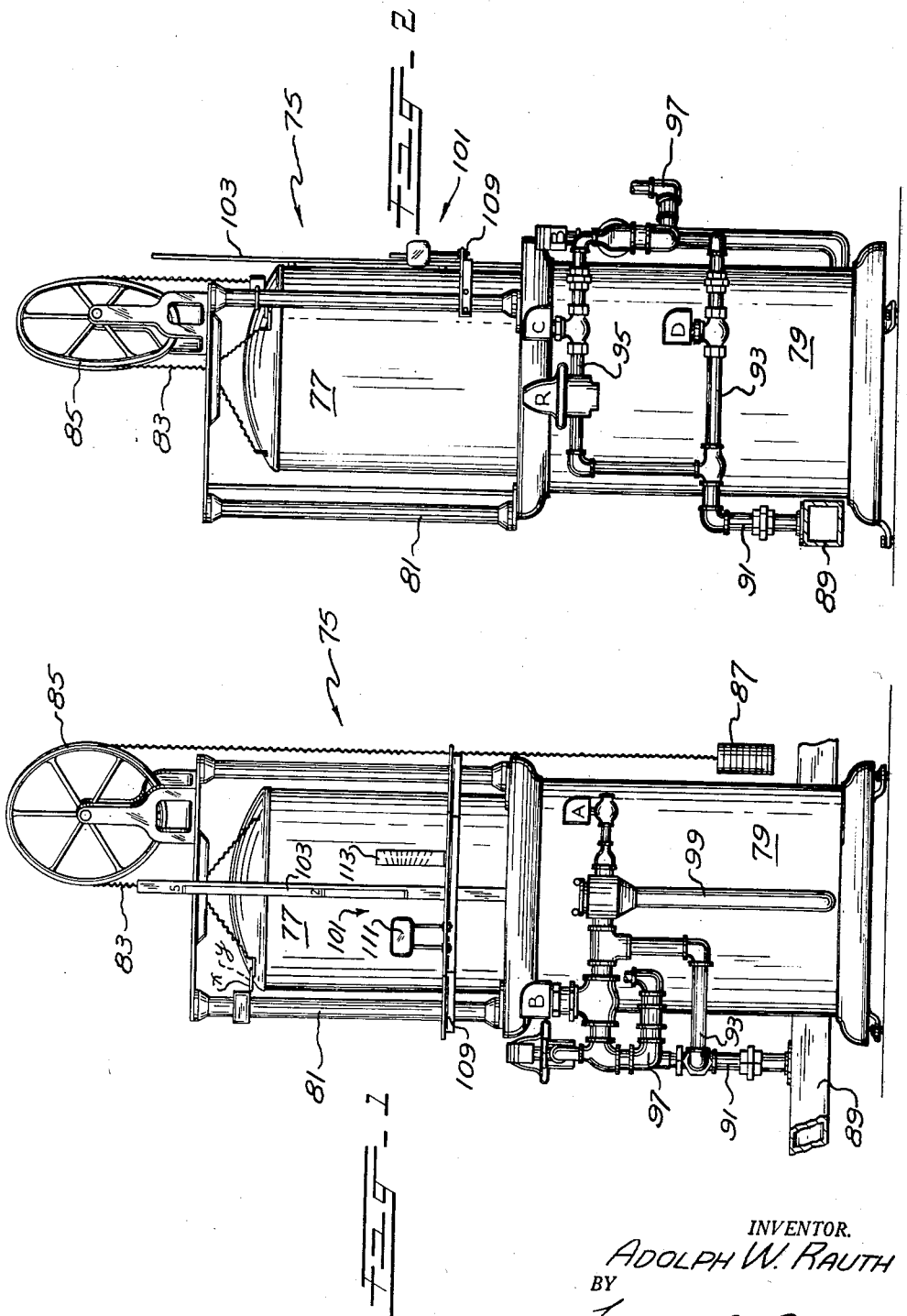
INVENTOR.
ADOLPH W. RAUTH
BY

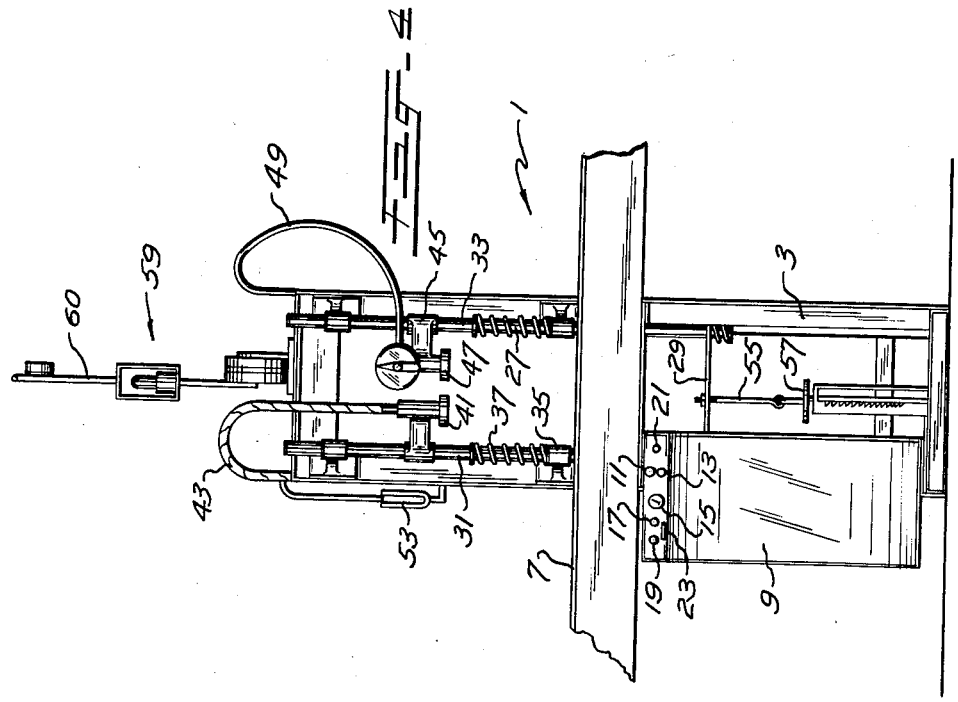
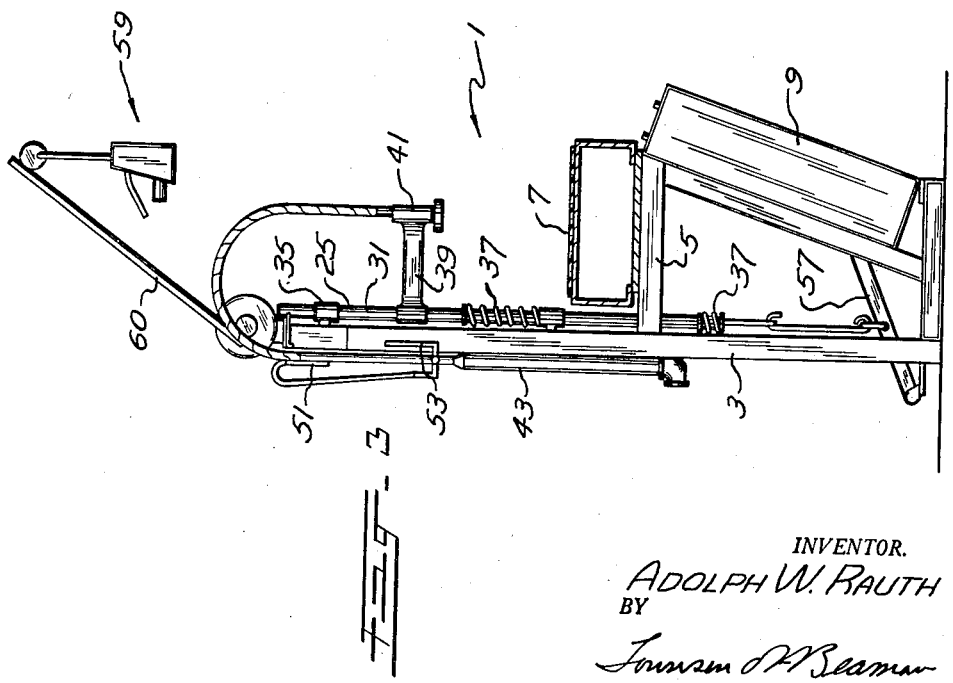

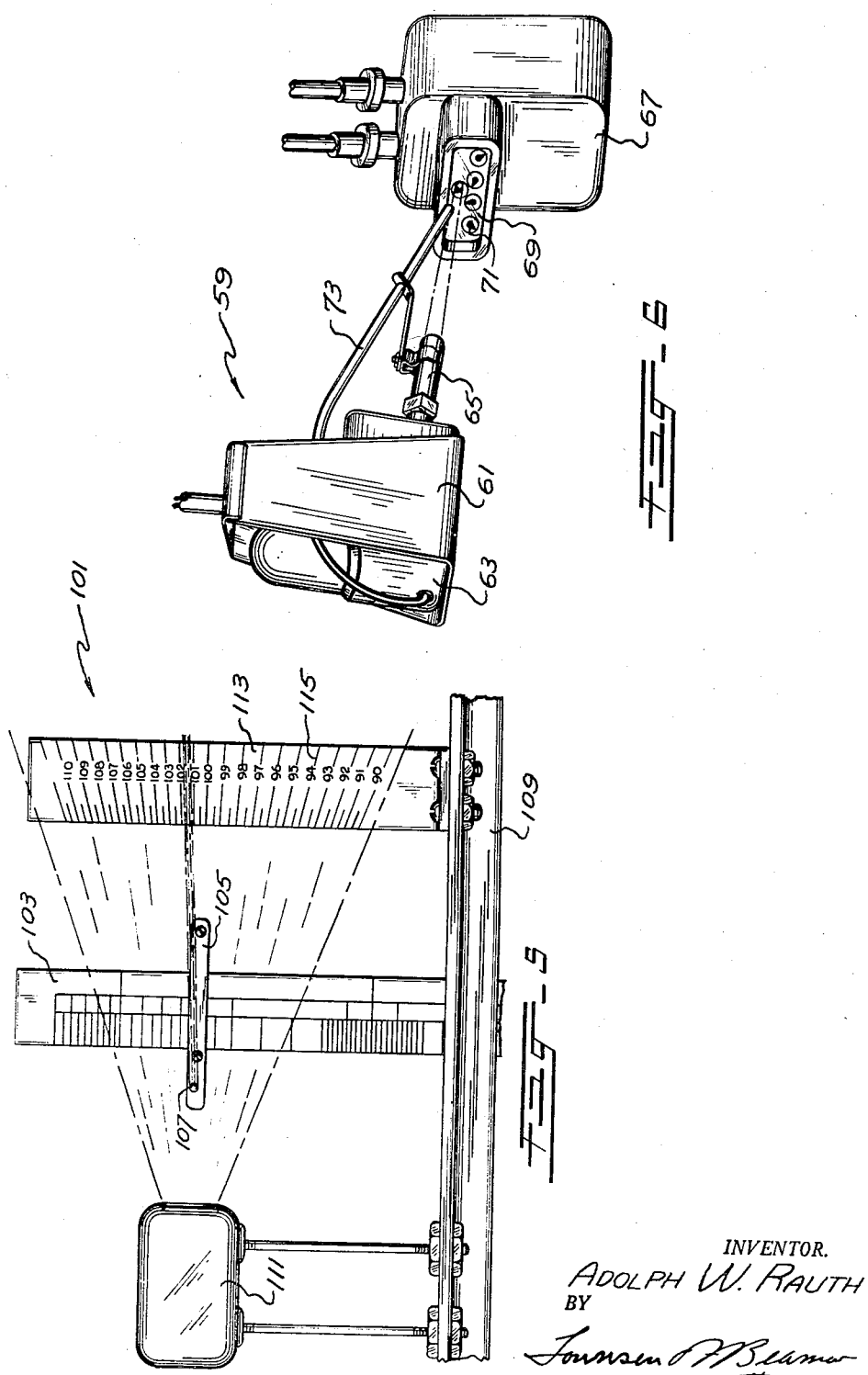

United States Patent Office 2,931,216
Patented Apr. 5, 1960

2,931,216

SYSTEM OF TESTING GAS METERS

Adolph W. Rauth, Jackson, Mich.

Application October 24, 1955, Serial No. 542,126

13 Claims. (Cl. 73—3)

The present invention relates to apparatus and method for testing gas meters to determine the accuracy of reading of the meters.

For many years, gas meters have been tested by means of a prover bell which would discharge a predetermined volume of gas into the meter. The meter reading would then be compared with the actual volume of gas run through the meter, in order to determine the accuracy of meter reading. In practice, the valves leading into and out of the prover bell were operated manually. The operator would open the valve leading into the prover bell until the bell was filled with the required volume of gas. He would then connect the bell with the inlet spud of the meter, record the meter reading, and then open the valve connecting the bell and the meter. When the bell had discharged a predetermined volume of gas into the meter, he would shut the valve between the bell and the meter and again record the meter reading. If the difference of the two meter readings did not correspond to the actual volume of gas discharged from the bell, he would be able to compute the error in meter reading.

Needless to say, such a procedure required the constant attendance of the operator and was subject to a number of inaccuracies arising from human error. Moreover, even with the most accurate performance of this procedure, the results were subject to an unavoidable error by virtue of the fact that the gas from the prover bell initiated operation of the moving parts of the meter against the inertia of these parts. Thus, meters which in fact were accurate in operation nevertheless showed an error even when carefully tested, because the test conditions did not correspond to actual conditions of operation.

Although many attempts were made to overcome the foregoing and other difficulties and disadvantages, none, so far as I am aware, was completely successful when practiced commercially on an industrial scale.

Accordingly, it is an object of my invention to provide apparatus for testing gas meters which will function automatically to perform the test functions and thereby greatly decrease the amount of time the operator must devote to each test.

Another object of the invention is to provide apparatus for testing gas meters, which will function with much greater accuracy than any apparatus known heretofore.

Still another object of the invention is the provision of apparatus for testing gas meters, in which the inaccuracies arising from the inertia of the working parts of the meter will be avoided.

The invention further contemplates the provision of apparatus for testing gas meters, including a photoelectric sensing device operable to control the apparatus with great delicacy.

The invention also contemplates apparatus for testing gas meters, having a bodily movable gas container in combination with means for automatically zeroing the container to position it accurately at the beginning of a test.

The invention also relates to apparatus for testing gas meters, in which various volumes of test gas may be used in conjunction with readings from any of the pointers on the meter index.

Still another object of the invention is the provision of apparatus for testing gas meters, having improved indicia for indicating the accuracy of the meter reading.

A still further object of the invention is the provision of apparatus for testing gas meters, which will be relatively inexpensive to manufacture and install, easy to operate, and rugged and durable in use.

Finally, it is an object of my invention to provide a method for testing gas meters, in which the accuracy of the test results will be greatly improved.

Other objects and advantages will become apparent from the following description taken in conjunction with the accompanying drawings, in which:

Figure 1 is a front elevational view of a prover stand comprising a portion of the apparatus of my invention;

Figure 2 is a left side elevational view of the prover stand of Figure 1;

Figure 3 is a left side elevational view, partly in cross-section, of a test stand forming a portion of the apparatus of my invention;

Figure 4 is a front elevational view of the test stand of Figure 3;

Figure 5 is a front elevational view of the indicia means according to my invention;

Figure 6 is a perspective view showing the relationship between a photoelectric sensing device according to my invention and a meter under test.

Figure 7:
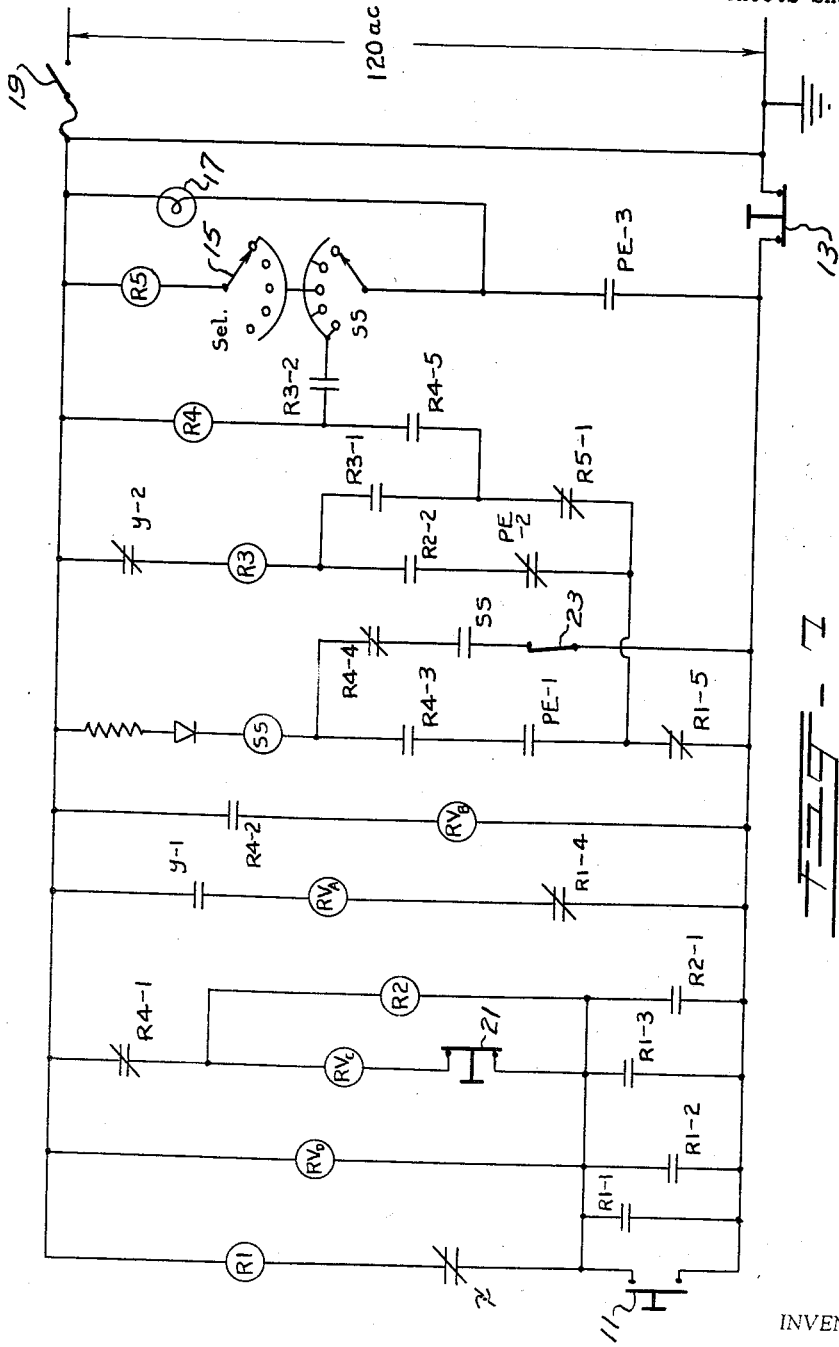
Figure 7 is a circuit diagram showing the essential operative relationship of the various parts of my invention.

A brief summary of my system for testing gas meters is as follows:

The meters are placed on a conveyor and brought into the test stand where they are connected with inlet and outlet gas ducts. A photoelectric sensing assembly is directed on the meter index so that a slender beam of light from a light source will fall on the light colored plate of the index and be cut by a revolving pointer each time the pointer revolves. The change in intensity of light reflected from the index when the dark colored pointer is cutting the light beam will be sensed by the photoelectric device to perform various functions described hereinafter.

When operation of the device is initiated, the valves are automatically opened which send air into the prover bell and at the same time into the meter so that the meter will be running before the test starts. The bell is raised to a point above the zero mark until it strikes the switch, thus automatically shutting off air flowing into the bell and at the same time opening a bleeder valve, which allows the bell to settle to zero. At zero, another switch is struck, thus closing the bleeder valve and holding the bell at zero.

In the meantime, auxiliary air has been flowing through the meter, and the index pointer has been revolving, periodically cutting the light beam. After the bell is zeroed, the next impulse from the photoelectric device caused by the pointer cutting the light beam automatically operates immediately to shut off the auxiliary air and simultaneously permit air to pass from the bell through the meter. A predetermined number of impulses later, which may be as few in number as one, a counting device immediately shuts off air to the meter from the bell upon achievement of that number of impulses corresponding to a predetermined number of revolutions of the pointer. Indicia means including a shadow scale associated with the prover bell then provides a comparison of the actual position of the prover bell with the position the bell would have reached traveling a predetermined distance corresponding to a predetermined volume of gas discharged from the bell, according to the actual reading of the meter. After its inception, the test has been entirely automatic except for the final reading of the shadow scale. Moreover, by virtue of the simultaneous switch from auxiliary air to test air, the meter was fully running at the beginning of the test thereby avoiding inaccuracies due to the inertia of the moving parts of the meter.

Referring now to the drawings in greater detail, I have shown in Figures 3 and 4 a test stand generally indicated at 1, comprising an upright framework 3 having forwardly extending meter support 5 on which is disposed a circulating conveyor belt to receive and carry meters from a loading station to the test station.

For the convenience of the operator at the test stand, a control box 9 is provided having a readily accessible control panel including a start switch 11, a stop switch 13, a revoluble selector switch for predetermining the number of pointer revolutions to comprise a test cycle, an illuminable indicator 17, a power switch 19, a leak test switch 21, and an interrupter switch 23. The function of these controls will be described in greater detail in connection with the circuit diagram and the operation of the device.

Also at the test stand, a rapid connection assembly 25 is provided for connecting meters under test into the fluid circuit. This assembly comprises a vertically reciprocable yoke frame 27 including a horizontal cross piece 29 and a pair of upright rods 31 and 33 having sliding engagement in fixed guide collars 35 and continuously urged upwardly by coil compression springs 37.

Outstanding from rod 31 is a bracket 39 mounting thereon the inlet gas connection 41 for the meter under test. Connection 41 is fed with inlet gas by inlet gas tubing 43. Outstanding from rod 33 is a similar bracket 45 mounting thereon exhaust gas connection 47 exhausting through exhaust gas tubing 49 past a draft gauge 51 and a pressure gauge 53.

Assembly 25 is depressed to attach it to a meter under test by means of a connector bar 55 depending from cross piece 29 and having link connection with a foot treadle 57 which the operator may depress to lower the entire assembly 25 against the action of springs 37. Means such as a ratchet assembly are provided to hold treadle 57 in lowered position thereby to maintain engagement of the assembly with the meter under test.

At the test stand is also a photoelectric sensing assembly 59 mounted on an articulated bracket 60 having friction elbow joints such that assembly 59 may be positioned wherever desired in the vicinity of a meter under test. The components of assembly 59 are perhaps best seen in Figure 6 to comprise a light source 61 comprising a lamp 63 and a lens system 65 for purposes of directing a slender beam of light from lamp 63 onto the index of a meter under test.

Also in Figure 6 is shown the relationship of assembly 59 to a gas meter 67 in test position. As is conventional in such meters, each meter 67 has a gas volume index 69 comprising a light-colored plate, for example of white enamel, on which are revoluble a plurality of dark-colored pointers 71. As is usual, the pointers revolve at different speeds to indicate the passage of different volumes of gas for each revolution of each pointer. The beam of light shining on the plate of the index is largely reflected therefrom back through a Lucite tube 73 to the photoelectric cell and relay (not shown). However, when a pointer 71 revolves so as to cut through the beam of light, the light reflected back will be substantially reduced in intensity. This reduction in intensity will result in an impulse being sent through the system, as later described in greater detail. This impulse will be sent each time pointer 71 cuts the light beam. The light beam remains fixed in position with regard to index 69; and therefore, the impulse will be sent at intervals corresponding exactly to one revolution of the pointer 71.

The prover bell stand generally indicated at 75, is shown in Figures 1 and 2 to comprise a gas container or a prover bell 77 vertically reciprocable in a base 79 in gas tight relationship therewith. Bell 77 is supported within base 79 by an upright frame 81 mounted on base 79 and in twin mounting thereon chains 83 reeved over pulley 85 to carry at one end prover bell 77 and at the other end counter-weight 87 by which the weight of bell 77 is almost balanced.

Pressure air to the bell and meter is supplied by a pressure air duct 89. Although the term "air" is used at places throughout the specification, it will of course be understood any gas is useful for the purposes herein contemplated. Air under pressure from duct 89 passes upward through piping 91 and then through piping 93 and 95. Air passes through piping 95 under the control of valve C, and then through piping 97 to the meter under test. Air following this path bypasses the prover bell and comprises the auxiliary air which causes the meter to be fully running at the beginning of a test. Air passing through piping 93 does so under the influence of the valve D, and passes through piping 99 into the prover bell to cause the same to rise until full. The valve A is a small bleeder valve through which air is exhausted from the prover bell through piping 99. Valve B is the valve controlling passage of air out of the prover bell through piping 99 and through piping 97 to the meter under test. Air following the path through piping 99 past valve B and through piping 97 to the meter is the test air, the volume of which is determinable by the distance through which bell 77 falls in order to discharge such test air. That is to say that bell 77 is bodily movable through a predetermined distance in order to discharge a predetermined volume of air therefrom; and any deviation of the actual extent of movement from such predetermined distance is indicative of the accuracy of a meter which reads such predetermined volume.

For purposes of comparing that actual extent of movement of bell 77 from a fixed position comprising the zero level, with the predetermined distance from that fixed position corresponding to the actual meter reading, indicia means generally indicated at 101 are provided. Means 101 include a vertical strip 103 fastened to and movable with bell 77 and having thereon a sliding bracket 105 having an outstanding slender pin 107 projecting outward from its surface. Providing a stationary support for other components of indicia means 101 is a cross piece 109 mounted on upright frame 81 and bearing a stationary light source 111. Also on cross piece 109 is mounted a stationary vertical scale 113 having a plurality of graduations 115 thereon extending radially outwardly of light source 111 and numbered with the several sequential integers lying on either side of 100. Light source 111 is adapted to cast light on scale 113; and pin 107 is adapted to move downwardly between light source 111 and scale 113 as prover bell 77 settles to discharge gas therefrom, whereby pin 107 will cast a shadow on scale 113. If pin 107 on sliding bracket 105 is set at a point corresponding to, say, two cubic feet of gas discharged from bell 77, then when bell 77 has actually discharged exactly two cubic feet, the shadow from pin 107 will fall on the 100 mark of scale 113. However, means are provided, to be described later, whereby downward movement of bell 77 is halted when the meter has achieved a certain predetermined reading, regardless of whether the bell 77 has actually discharged an exactly corresponding volume of gas. Hence, the position of the shadow on scale 113 shows the percentage of the gas actually discharged which is read by the meter.

The operation of my invention is as follows:

Meters 67 are placed on conveyor belt 7 with their indices to the right as seen in Figure 3. The conveyor is operated to bring a meter 67 within test stand 1 adjacent rapid connection assembly 25. The operator then depresses treadle 57 to lower assembly 25 until connections 41 and 47 contact the inlet and outlet spuds respectively of meter 67 to complete the fluid circuit through the meter.

The operator then pulls down photoelectric assembly 59 and positions it in front of the meter so that the slender beam of light from lamp 63 shines on and is reflected from the gas volume index of meter 67, and so that the small spot of light cast by the beam lies within the circle swept by a pointer 71. For purposes of this illustration, let it be assumed that the operator desires to run 5 cubic feet of test gas through the meter and considers that five revolutions of a pointer 71 will permit sufficiently accurate testing. For this purpose, the operator trains the beam of light on the one cubic foot dial of index 69. He also slides bracket 105 up strip 103 to the 5 cubic foot mark. He then sets selector switch 15 at the "5" reading, thereby assuring that the test cycle will cover five full revolutions of pointer 71.

With switches 13, 19, 21 and 23 closed, the operator then presses start switch 11 to close the same. Upon the closing of the start switch 11, a fully automatic test cycle begins; and for purposes of following this cycle, reference to the circuit diagram comprising Figure 7 of the drawings is advisable. Closing start switch 11 energizes relays 1 and 2 and the relays of valves D and C to open the same. Relay 1 closes relay switches R1–1, R1–2, R1–3, and opens relay switches R1–4 and R1–5. Upon opening of valve D, air or other gas is admitted from duct 89 through piping 91, 93 and 99 into prover bell 77, causing the same to rise. At the same time, the opening of valve C admits auxiliary air from duct 89 through piping 91, 95, 97 and 43 into meter 67 to cause it to be fully running at the time the actual test begins.

Upon rising to its upper limit, prover bell 77 strikes and mechanically actuates switches x and y, opening x, closing y–1, and opening y–2. On the opening of x, relay 1 drops out, opening relay switches R1–1, R1–2 and R1–3, and closing R1–4 and R1–5. The relay of valve D is thereby de-energized, closing the valve and preventing further entry of air into bell 77, and thereby stopping upward travel of bell 77. At the same time, the closing of y–1 energizes the relay of bleeder valve A, opening the valve to bleed gas from the prover bell to the atmosphere at a controlled rate, to eliminate excess air and to cause bell 77 to settle slowly to a zero position. At the zero position, bell 77 loses contact with y–1 and y–2, allowing the former to open and the latter to close. When y–1 opens, bleeder valve A is closed and bell 77 remains at its zero level.

All the while, relay 2 and the relay of valve C have been energized, permitting auxiliary air to move from duct 89 to meter 67 without traveling through bell 77, thereby to assure that meter 67 will be fully running at the instant the test begins, and maintaining relay switches R2–1 and R2–2 closed. Now, with bell 77 zeroed and auxiliary air passing through the meter, as evidenced by R1–5, R2–2 and y–2 being closed, the test is ready to begin.

At this point, the very next impulse from the photoelectric pickup will energize relay 3, which is an auxiliary start-count relay whose functions are to monitor the power zeroing operation and to prevent the stepping switch (SS) from operating before zeroing is complete. Likewise, relay 3 obviously cannot pick up if, at the instant leveling is completed, the photoelectric relay is energized, as will be apparent from a consideration of the photoelectric relay switch PE–2. This prevents starting of a test except at the beginning of a photoelectric impulse.

Energization of relay 3 closes relay switches R3–1 and R3–2, thus energizing relay 4, which in turn opens R4–1 and R4–4 and closes R4–2, R4–3 and R4–5. This permits the stepping switch relay to advance one position for each impulse of the photoelectric relay.

Energization of relay 4 energizes the relay of valve B, because R4–2 closes, thus opening valve B so that the gas in bell 77 may pass out through piping 99 past valve B, through piping 97 and into meter 67. At the same instant, the opening of R4–1 de-energizes the relay of valve C, closing valve C and cutting off auxiliary air which had heretofore been passing from duct 89 to meter 67 without going through bell 77. Thus, auxiliary air is bypassing bell 77 and moving through meter 67 until the test begins; but at the very instant the test begins, the gas passing through the meter is switched from auxiliary air to test air from bell 77, without any delay or break in the passage of gas through meter 67. For this reason, meter 67 is fully running at the very instant the test begins, so that there is absolutely no inertia of the moving parts of meter 67 to introduce an error into the determination of accuracy of meter 67.

With the meter running on prover air, photoelectric relay impulses occur each 360° of rotation of pointer 71; and each impulse advances the stepping switch one position. When the selected number of counts is obtained, in this case 5, relay 5 is energized. Relay 5 is the stop relay which opens R5–1 and in turn de-energizes relay 4. Upon the de-energization of relay 4, R4–1 and R4–4 close and R4–2, R4–3 and R4–5 open. In turn, the relay of valve B is de-energized and valve B closes, which halts the descent of prover bell 77 and also halts the revolutions of pointer 71, since it halts the passage of test gas through meter 67. The stepping switch relay is also de-energized and the stepping switch is automatically reset to its zero or normal position; and all relays and valves are now de-energized and ready for the next test sequence.

During the test, bell 77 has dropped until pin 107, set at the 5 cubic foot mark on strip 103 on bell 77, has passed down between light source 111 and scale 113, thereby indicating the discharge of roughly 5 cubic feet of air from bell 77. The meter reading on index 69 now indicates the passage of exactly 5 cubic feet of gas through the meter; and if indicia means 101 show that exactly 5 cubic feet of gas has been discharged from bell 77, then the meter is reading true. In order to determine whether this is so, the shadow cast by pin 107 is observed as it falls on scale 113. If the shadow falls exactly on the 100 mark, the meter is reading true; but if the shadow falls above 100, say on 102, then the meter is reading 2% fast, which is to say that the volume of gas indicated by the meter is 102% of the gas actually passing through the meter. If the shadow scale were to read 98, then the meter would be reading 2% slow; and the gas actually passing through the meter would be recorded only to the extent of 98% thereof by the meter.

It will be obvious that the counting mechanism comprising the selector and stepping switch is not absolutely necessary but is merely a refinement to give greater accuracy. Needless to say, the accuracy of the test is improved by multiplying the number of revolutions through which the pointer 71 must turn in order to complete the test. However, suitable results may be obtained by so adjusting the device or so arranging the electrical circuit that a first impulse starts the test and the very next impulse ends the test after but one full revoluion of pointer 71.

Moreover, it will be apparent that from the closing of start switch 11, the whole test is automatic. Therefore, the operator may set up the test and start it and then pass on to another testing station to repeat the operation. In this way, an operator may cover a plurality of testing stations operating simultaneously. When the test in the last station has been initiated, he may then go back to the first station and begin collecting the completed readings which will be held indefinitely on shadow scale 113. In this way, a single operator may perform the work which had heretofore required the services of a plurality of operators.

Moreover, it will be obvious that the accuracy of test results obtainable by use of my novel apparatus and method will be much greater than that heretofore possible, not only because the meter is running at the instant the test begins, but also because of the novel indicia means and the novel and automatic electrical operating means and photoelectric sensing means.

Thus, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Apparatus for testing gas meters, comprising in combination, a prover bell bodily movable to discharge gas therefrom, means including a valve for introducing gas discharged from said prover bell by the movement thereof into a meter to be tested, means actuating said valve responsive to the reaching of predetermined positions by the meter indicator during operation of the meter to initiate and halt bodily movement of said prover bell, and indicia means coupled to said prover bell to indicate the extent of bodily movement of said prover bell.

2. Apparatus for testing gas meters, comprising in combination, a gas container bodily movable to discharge gas therefrom, means including a valve for introducing gas discharged from said container by movement thereof into a meter to be tested, means actuating said valve responsive to the reaching of predetermined positions by the meter indicator during operation of the meter to initiate and halt bodily movement of said container, and indicia means coupled to said container to indicate the extent of bodily movement of said container.

3. Apparatus for testing gas meters, comprising in combination, a gas container bodily movable through a predetermined distance to discharge a predetermined volume of gas therefrom, means including a valve for introducing gas discharged from said container by movement thereof into a meter to be tested, means actuating said valve responsive to the reaching of predetermined positions by the meter indicator during operation of the meter to initiate and halt bodily movement of said container simultaneously with the beginning and end of the predetermined meter operation respectively, and indicia means coupled to said container to indicate the extent of bodily movement of said container thereby to permit comparison of said extent of bodily movement with the predetermined meter operation.

4. The invention of claim 3, in which said indicia means comprises a stationary light source and a stationary, graduated scale, said light source being adapted to direct light on said scale, and means movable with said container between said light source and said scale to cast a shadow on said scale, the position of said shadow on said scale indicating the accuracy of said operation of the meter.

5. Apparatus for testing gas meters having a gas volume index including a plurality of revoluble pointers, comprising in combination a gas container bodily movable a predetermined distance to discharge a predetermined volume of gas therefrom, means for introducing gas discharged from said container by movement thereof into a meter to be tested, means automatically responsive to a predetermined number of revolutions of one of the pointers to halt bodily movement of said container simultaneously with the completion of said predetermined number of revolutions, and indicia means coupled to said container to indicate the extent of bodily movement of said container thereby to permit comparison of said extent of bodily movement with said predetermined distance.

6. The invention of claim 5, in which said automatically responsive means comprises a light source directing a slender beam of light toward the index to be reflected from the index and cut by the one pointer once for each revolution of the pointer, photoelectric means to receive light reflected from the index and to transmit an impulse each time the intensity of said reflected light is altered by passage of the pointer through said slender beam, and counting and arresting means to receive and count said impulses from said photoelectric means and to arrest movement of said container immediately upon receipt of a predetermined number of said impulses.

7. Apparatus for testing gas meters having a gas volume index including a plurality of revoluble pointers, comprising in combination prover bell means for introducing gas into a meter to be tested, indicia means coupled to said prover bell means for indicating the volume of gas introduced into the meter, a light source for directing a slender beam of light towards the index to be reflected from the index and cut by one of the pointers once for each revolution of the pointer, photoelectric means to receive light reflected from the index and to transmit an impulse each time the intensity of said reflected light is altered by passage of the pointer through said slender beam, and counting and arresting means to receive and count said impulses from said photoelectric means and to arrest said means for introducing gas into the meter immediately upon receipt of a predetermined number of said impulses, whereby said indicia means will indicate the accuracy of reading of the meter.

8. Apparatus for testing gas meters having a gas volume index including a revoluble pointer, comprising in combination prover bell means for introducing test gas into a meter to be tested, indicia means coupled to said prover bell means for indicating the volume of test gas introduced into the meter, a light source for directing a slender beam of light toward the index to be reflected from the index and cut by the pointer once for each revolution of the pointer, photoelectric means to receive light reflected from the index and to transmit an impulse each time the intensity of said reflected light is altered by passage of the pointer through said slender beam, means actuated by a first said impulse to actuate said means for introducing test gas, and means actuated by a second said impulse to arrest said means for introducing test gas, whereby said indicia means will indicate the accuracy of reading of the meter.

9. The invention of claim 8, and means for introducing auxiliary gas into the meter, said means actuated by said first impulse arresting said means for introducing auxiliary gas simultaneously with the actuation of said means for introducing test gas so that the meter will be running at the instant introduction of said test gas begins.

10. Apparatus for testing gas meters, comprising in combination means for introducing test gas into a meter to be tested, indicia means for indicating the volume of gas introduced into the meter, means for introducing auxiliary gas into the meter, means automatically responsive to a first predetermined reading of the meter operative simultaneously to arrest said means for introducing auxiliary gas and to actuate said means for introducing test gas so that the meter will be running at the instant introduction of said test gas begins, and means automatically responsive to a second predetermined reading of the meter to arrest said means for introducing test gas simultaneously with the achievement of said second reading so that said indicia means will indicate the accuracy of reading of the meter.

11. Apparatus for testing gas meters, comprising in combination a gas container bodily movable from a fixed position through a predetermined distance to discharge a predetermined volume of gas therefrom, means for introducing gas discharged from said container by movement thereof into a meter to be tested, means automatically responsive to a first predetermined reading of the meter to initiate bodily movement of said container only when said container is in said fixed position, means automatically responsive to a second predetermined reading of the meter to halt bodily movement of said container simultaneously with the achievement of said second reading, and indicia means coupled to said container to indicate the extent of bodily movement of said container thereby to permit comparison of said extent of bodily movement with said predetermined distance.

12. The invention of claim 11, and means automatically positioning said container in said fixed position.

13. The invention of claim 11, and means for introducing auxiliary gas into the meter, said means responsive to said first reading arresting said means for introducing auxiliary gas simultaneously with the initiation of bodily movement of said container so that the meter will be running at the instant introduction of said test gas begins.

References Cited in the file of this patent

UNITED STATES PATENTS

| | | |
|---|---|---|
| 1,615,572 | Cummer | Jan. 25, 1927 |
| 1,747,439 | Huettig | Feb. 18, 1930 |
| 1,880,562 | Weckerly | Oct. 4, 1932 |
| 2,309,117 | John | Jan. 26, 1943 |
| 2,448,616 | Oakley et al. | Sept. 7, 1948 |
| 2,510,327 | Bennett | June 6, 1950 |
| 2,561,904 | Burch | July 24, 1951 |
| 2,707,390 | Beretish | May 3, 1955 |